United States Patent Office 3,210,307
Patented Oct. 5, 1965

3,210,307
MIXTURES OF POLYCHLORONAPHTHALENES, ETHYLENE - VINYL ACETATE COPOLYMER, AND CHLORINATED POLYETHYLENE
Carlo Paoloni, Milan, Italy, assignor to Società Elettrica ed Elettrochimica del Caffaro S.p.A., Milan, Italy, a company of Italy
No Drawing. Filed Oct. 18, 1962, Ser. No. 231,565
Claims priority, application Italy, Apr. 4, 1962, Patent 664,941
2 Claims. (Cl. 260—28.5)

It is well known that polychloronaphthalenes having a content of 50 to 52% of chlorine constitute compositions of a wax-like nature, generally employed as dielectric compositions.

However, the polychloronaphthalenes have the disadvantage of being neither flexible, nor elastic, and consequently of only providing a reduced adhesiveness and of easily flaking off.

These disadvantages have greatly limited the possibilities of using polychloronaphthalenes in their different applications.

The applicants have now found a process for imparting the required qualities of flexibility, elasticity and adhesiveness to the polychloronaphthalenes.

The process forming the subject of the present invention consists in adding ethylene-vinyl copolymers with chlorinated polyethylene polymers preferably obtained from polyethylene of high pressure type to the polychloronaphthalenes at melting point or at a temperature above melting point.

The ethylene-vinyl copolymers are those formed by copolymers of high molecular weight obtained from ethylene and vinyl compounds, with a variable proportion between the ethylene fraction and the vinyl fraction. The ethylene and vinyl acetate copolymers are particularly suitable for this purpose. Among the chlorinated polyethylenes, the compounds preferably having a content of 60 to 66% of chlorine are particularly adapted for the purposes of the present invention.

The proportions between the polychloronaphthalenes, the ethylene-vinyl copolymers and the chlorinated polyethylene polymers can vary within fairly wide limits, depending on the required degree of plasticity, flexibility and adhesiveness.

Adjuvants, plasticisers and stabilisers are added to the aforementioned compositions in order further to improve the quality thereof.

EXAMPLE 1

70 parts of polychloronaphthalenes having a softening point of 98° C. are heated to melting point, while stirring and while keeping the temperature at 120° C. and then 15 parts of ethylene-vinyl acetate copolymer are added, followed gradually by 15 parts of chlorinated polyethylene with a chlorine content of 65%.

After cooling, a composition having a good flexibility and good adhesive qualities is obtained.

EXAMPLE 2

70 parts of polychloronaphthalene having a softening point of 120° C. are brought to melting point and then kept at 150° C. and then there are added, while stirring, 18 parts of ethylene-vinyl acetate copolymer, followed by 10 parts of chlorinated polyethylene having a chlorine content of 66% and 2 parts of epoxide resin.

After cooling, a composition is obtained which has the required degrees of flexibility and adhesiveness. The compositions of plastic materials forming the subject of the present invention are particularly suitable for being used as dielectric substances and for impermeable, non-inflammable and anti-corrosive coatings.

It is obvious that the above embodiments have only been given by way of example, which do not limit in any way the much wider field of the present invention.

Wherever relative parts of the ingredients contained in the compositions herein described and claimed are stated, such references are in parts by weight.

I claim:

1. A process for the manufacture of plastic compositions having qualities of flexibility and adhesiveness and which are particularly adapted to be employed as dielectric materials and for making impervious, non-inflammable and corrosion-resisting coatings, said compositions being based upon polychloronaphthalenes, comprising the steps of adding to polychloronaphthalene at a temperature not lower than the melting point and with stirring until completely dissolved and a homogeneous mass is obtained, from 15% to 18%, based upon the total weight of the resulting composition, of ethylene-vinyl acetate copolymer and from 10% to 15%, based upon the total weight of the resulting composition, of chlorinated polyethylene, and thereafter cooling the mixture so obtained.

2. A process according to claim 1, wherein the chlorinated polyethylene contains from 60% to 66% chlorine.

References Cited by the Examiner

UNITED STATES PATENTS

| | | | |
|---|---|---|---|
| 2,248,749 | 7/41 | Engelhardt et al. | 260—33.8 |
| 2,877,196 | 3/59 | Reding | 260—28.5 |
| 2,953,541 | 9/60 | Pecha et al. | 260—45.5 |
| 2,959,562 | 11/60 | Klug | 260—33.8 |

MORRIS LIEBMAN, *Primary Examiner.*